US010486707B2

United States Patent
Zelman et al.

(10) Patent No.: US 10,486,707 B2
(45) Date of Patent: *Nov. 26, 2019

(54) PREDICTION OF DRIVER INTENT AT INTERSECTION

(71) Applicant: GM GLOBAL TECHNOLOGY OPERATIONS LLC, Detroit, MI (US)

(72) Inventors: Ido Zelman, Ra'anana (IL); Upali P. Mudalige, Oakland Township, MI (US); Thanura Ranmal Elvitigala, Hershey, PA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 198 days.

This patent is subject to a terminal disclaimer.

(21) Appl. No.: 14/989,531

(22) Filed: Jan. 6, 2016

(65) Prior Publication Data
US 2017/0190334 A1    Jul. 6, 2017

(51) Int. Cl.
*B60W 40/09*     (2012.01)
*G08G 1/16*      (2006.01)
(Continued)

(52) U.S. Cl.
CPC ...... *B60W 40/09* (2013.01); *B60W 30/18145* (2013.01); *B60W 30/18154* (2013.01);
(Continued)

(58) Field of Classification Search
CPC ............ B60W 40/09; B60W 2420/42; B60W 2420/52; B60W 2900/00; B60W 2520/10;
(Continued)

(56) References Cited

U.S. PATENT DOCUMENTS 7,124,027 B1 * 10/2006 Ernst, Jr. ............... B60W 30/09
340/435
8,072,370 B2 * 12/2011 Woodington ........... G01S 13/34
340/435
(Continued)

FOREIGN PATENT DOCUMENTS

JP    2002190092 A    7/2002

OTHER PUBLICATIONS

Lefèvre, Stèphanie et al., "A Survey on Motion Prediction and Risk Assessment for intelligent Vehicles" ROBOMECH Journal, 2014 1:1, 14 pgs.
(Continued)

*Primary Examiner* — Jelani A Smith
*Assistant Examiner* — Majdi Alsomiri
(74) *Attorney, Agent, or Firm* — Cantor Colburn LLP

(57) ABSTRACT

A system and method for predicting whether a driver of a host vehicle or a remote vehicle intends to make a left or right turn or travel straight through an intersection before the host vehicle or remote vehicle reaches the intersection that relies on a probability model that employs a dynamic Bayesian network. The method includes obtaining a plurality of environmental cues that identify external parameters at or around the intersection, where the environmental cues include position and velocity of the remote vehicle, and obtaining a plurality of host vehicle cues that define operation of the host vehicle. The method then predicts the turning intent of the host vehicle and/or remote vehicle at the intersection using the model based on both the external cues and the vehicle cues using the model. The model can use learned information about previous driver turns at the intersection.

18 Claims, 3 Drawing Sheets

(51) Int. Cl.
*B60W 50/00* (2006.01)
*B60W 30/18* (2012.01)
*G08G 1/0967* (2006.01)

(52) U.S. Cl.
CPC ... *B60W 50/0097* (2013.01); *G08G 1/096725* (2013.01); *G08G 1/096758* (2013.01); *G08G 1/096775* (2013.01); *G08G 1/096783* (2013.01); *G08G 1/096791* (2013.01); *G08G 1/166* (2013.01); *B60W 2050/0029* (2013.01); *B60W 2050/0089* (2013.01); *B60W 2420/42* (2013.01); *B60W 2420/52* (2013.01); *B60W 2520/06* (2013.01); *B60W 2520/10* (2013.01); *B60W 2520/105* (2013.01); *B60W 2520/14* (2013.01); *B60W 2540/18* (2013.01); *B60W 2550/146* (2013.01); *B60W 2550/22* (2013.01); *B60W 2550/30* (2013.01); *B60W 2550/402* (2013.01); *B60W 2900/00* (2013.01)

(58) Field of Classification Search
CPC ....... B60W 2520/105; B60W 2520/14; B60W 2520/06; B60W 2540/18; B60W 2550/146; B60W 2550/22; B60W 2550/402; G08G 1/166

See application file for complete search history.

(56) References Cited

U.S. PATENT DOCUMENTS

| | | | | |
|---|---|---|---|---|
| 8,410,920 | B2* | 4/2013 | Ito | B60Q 5/006 340/435 |
| 8,618,952 | B2* | 12/2013 | Mochizuki | G08G 1/161 340/435 |
| 9,141,909 | B2 | 9/2015 | Hisano | |
| 9,177,477 | B2* | 11/2015 | Mochizuki | G08G 1/161 |
| 2007/0043506 | A1* | 2/2007 | Mudalige | B60T 7/22 701/301 |
| 2007/0276600 | A1* | 11/2007 | King | G08G 1/042 701/301 |
| 2008/0309468 | A1* | 12/2008 | Greene | G08G 1/166 340/436 |
| 2008/0312830 | A1* | 12/2008 | Liu | G08G 1/166 701/301 |
| 2008/0312831 | A1* | 12/2008 | Greene | G08G 1/166 701/301 |
| 2008/0312832 | A1* | 12/2008 | Greene | G08G 1/166 701/301 |
| 2008/0312833 | A1* | 12/2008 | Greene | G06K 9/00805 701/301 |
| 2009/0174540 | A1* | 7/2009 | Smith | B60Q 1/34 340/465 |
| 2010/0010733 | A1* | 1/2010 | Krumm | G01C 21/3484 701/533 |
| 2010/0305858 | A1* | 12/2010 | Richardson | G06K 9/00785 701/301 |
| 2011/0298603 | A1* | 12/2011 | King | G08G 1/164 340/436 |
| 2012/0154175 | A1* | 6/2012 | Bandou | G08G 1/164 340/905 |
| 2013/0194127 | A1* | 8/2013 | Ishihara | G01S 13/18 342/70 |
| 2014/0032089 | A1* | 1/2014 | Aoude | G08G 1/00 701/117 |
| 2014/0267734 | A1* | 9/2014 | Hart, Jr. | G06K 9/00785 348/149 |
| 2014/0350790 | A1* | 11/2014 | Akesson | G08G 1/167 701/41 |
| 2014/0372016 | A1* | 12/2014 | Buchholz | G08G 1/161 701/117 |
| 2015/0232104 | A1* | 8/2015 | Sudou | B60W 40/072 701/1 |
| 2015/0254977 | A1* | 9/2015 | Grabow | G08G 1/0141 340/903 |
| 2015/0314780 | A1* | 11/2015 | Stenneth | B60W 30/00 701/23 |
| 2015/0344030 | A1* | 12/2015 | Damerow | B60W 30/0956 701/1 |
| 2016/0137197 | A1* | 5/2016 | Hayakawa | B60K 26/04 701/70 |
| 2016/0368492 | A1* | 12/2016 | Al-Stouhi | B60W 30/18154 |
| 2017/0031361 | A1* | 2/2017 | Olson | G05D 1/0212 |
| 2017/0032402 | A1* | 2/2017 | Patsiokas | G06Q 30/0266 |
| 2017/0038217 | A1* | 2/2017 | Chambers | G05D 1/0268 |
| 2017/0039846 | A1* | 2/2017 | Chambers | G08G 1/0112 |
| 2017/0039853 | A1* | 2/2017 | Chambers | G01C 21/3492 |
| 2017/0154529 | A1* | 6/2017 | Zhao | B60W 30/12 |

OTHER PUBLICATIONS

Streubel, Thomas et al., "Prediction of Driver Intended Path at Intersections" Jun. 8-11, 2014, IEEE Intelligent Vehicles Symposium (IV), Dearborn, MI USA, pp. 134-139.

Herrmann, Simon et al., "Situation Analysis for Driver Assistance Systems at Urban Intersections" Jul. 24-27, 2012, IEEE International Conference on Vehicular Electronics and Safety, Istanbul, Turkey, pp. 151-156.

Lefèvre, Stephanie et al., "Risk Assessment at Road Intersections: Comparing Intention and Expectation" Jun. 3-7, 2012, IEEE Intelligent Vehicles Symposium, Alcaiá de Henares, Spain, pp. 165-171.

Lefèvre, Stèphanie et al., "Exploiting Map Information for Driver Intention Estimation at Road Intersections" Jun. 5-9, 2011, IEEE Intelligent Vehicles Symposium (IV), Baden-Baden, Germany, pp. 583-588.

Hülnhagen, Till et al., "Maneuver Recognition using Probabilistic Finite-State Machines and Fuzzy Logic" Jun. 21-24, 2010, University of California, San Diegao, CA, USA pp. 65-70.

Chinese Office Action for CN Application No. 201611216717.5 dated Mar. 4, 2019, pp. 1-7.

* cited by examiner

PREDICTION OF DRIVER INTENT AT INTERSECTION

BACKGROUND OF THE INVENTION

Field of the Invention

This invention relates generally to a system and method for predicting whether a driver of a host vehicle or remote vehicles intends to turn at an intersection as the host vehicle is approaching the intersection and, more particularly, to a system and method for predicting whether a driver of a host vehicle or remote vehicles intends to turn at an intersection as the host vehicle is approaching the intersection, where a prediction algorithm employs a dynamic Bayesian network (DBN).

Discussion of the Related Art

Object detection systems and collision avoidance systems are becoming increasingly common on modern vehicles. Object detection systems can provide a warning to a driver about an object in the path of a moving host vehicle. The warning can be a visual indication on the vehicles instrument panel or in a head-up display (HUD), and/or can be an audio warning such as chimes or other feedback device, such as haptic seat. Object detection systems can also provide input to active vehicle systems, such as adaptive cruise control systems, which control vehicle speed to maintain the appropriate longitudinal spacing to a leading vehicle, and rear cross traffic avoidance systems, which can provide both warnings and automatic braking to avoid a collision with an object behind the host vehicle when the host vehicle is backing up.

Active safety technology employing object detection systems is currently becoming a major area of research in the automotive industry. Advances in sensor and actuator technologies have enabled the development of driver assistance systems (DAS) to prevent road accidents, especially those caused by driver mistakes or inattention. Several types of DAS, such as anti-lock braking system (ABS), electronic stability control (ESC), adaptive cruise control (ACC), lane departure warning (LDW) system, lane change assist (LCA), forward collision alert (FCA), and lane keeping assist (LKA), are already in production vehicles. Collision imminent braking is an effective way of avoiding or mitigating a collision by applying the vehicle brakes. Collision avoidance systems may also provide steering commands that cause the host vehicle to follow a calculated steering path to provide the vehicle steering to avoid a collision when braking alone can only mitigate the collision.

The object detection sensors for these types of systems may use any of a number of technologies, such as short range radar, long range radar, cameras with image processing, laser or Lidar, ultrasound, etc. The object detection sensors detect vehicles and other objects in the path of a host vehicle. In many vehicles, the object detection sensors are integrated directly into the front bumper or other fascia of the vehicle, but other mounting locations are available.

Radar and lidar sensors that may be employed on vehicles to detect objects around the vehicle and provide a range to and orientation of those objects provide reflections from the objects as multiple scan points that combine as a point cloud (cluster) range map, where a separate scan point is typically provided for every ½° across the horizontal field-of-view of the sensor. These scan points also provide a reflectivity measure of the target surface in the form of intensity in addition to the range and azimuth angle values, and therefore, if a target vehicle or other object is detected in front of the host vehicle, there may be multiple scan points that are returned that identify the surface reflectivity, distance and azimuth angle of the target vehicle from the subject vehicle. By providing a cluster of scan return points, objects having various and arbitrary shapes, such as trucks, trailers, bicycle, pedestrian, guard rail, K-barrier, etc., can be more readily detected, where the bigger and/or closer the object to the host vehicle the more scan points are provided.

Cameras on a vehicle may provide back-up assistance, take images of the vehicle driver to determine driver drowsiness or attentiveness, provide images of the road as the vehicle is traveling for collision avoidance purposes, provide structure recognition, such as roadway signs, etc. Other vehicle vision applications include vehicle lane sensing systems to sense the vehicle travel lane and drive the vehicle in the lane-center. Many of these known lane sensing systems detect lane-markers on the road for various applications, such as lane departure warning (LDW), lane keeping (LK), lane centering (LC), etc., and have typically employed a single camera, either at the front or rear of the vehicle, to provide the images that are used to detect the lane-markers.

It is also known in the art to provide a surround-view camera system on a vehicle that includes a front camera, a rear camera and left and right side cameras, where the camera system generates a top-down view of the vehicle and surrounding areas using the images from the cameras, and where the images overlap each other at the corners of the vehicle. The top-down view can be displayed for the vehicle driver to see what is surrounding the vehicle for back-up, parking, etc. Future vehicles may not employ rearview mirrors, but may instead include digital images provided by the surround view cameras.

Various vehicle systems of the type being discussed herein require that the position and orientation of the vehicle be known. Currently, modern vehicles typically rely on a global navigation satellite system (GNSS), such as GPS, that provides signals to identify vehicle location.

Vehicle-to-vehicle (V2V) and vehicle-to-infrastructure (V2I) communications systems, sometimes referred generally as V2X systems, are known to those skilled in the art, and require a minimum of one entity to send information to another entity. For example, many vehicle-to-vehicle safety applications can be executed on one vehicle by simply receiving broadcast messages from a neighboring vehicle. These messages are not directed to any specific vehicle, but are meant to be shared with a vehicle population to support the particular application. In these types of applications where collision avoidance is desirable, as two or more vehicles talk to each other and a collision becomes probable, the vehicle systems can warn the vehicle drivers, or possibly take evasive action for the driver, such as applying the brakes. Likewise, traffic control units can observe the broadcast of information and generate statistics on traffic flow through a given intersection or roadway.

When roadways cross intersections are created. In order to prevent vehicles from colliding with each other at an intersection, some type of traffic control mechanism, such as stop signs, yield signs, traffic lights, etc., are generally provided so that perpendicularly or cross-traveling traffic can travel safely through the intersection. However, intersections, especially high traffic intersections, are still the cause of many vehicle collisions and traffic accidents.

Known object detection sensor systems that attempt to warn the driver of a potential collision when navigating through an intersection could benefit by knowing whether the driver intends to make a turn at the intersection or drive straight through the intersection before the host vehicle reaches the intersection, and know the intent of any remote vehicles in the intersection or also approaching the intersection. Although it is impossible to exactly know the turning intent of the drivers, algorithms can be developed that identify a probability that the driver will be making a turn or traveling straight, which could be helpful.

SUMMARY OF THE INVENTION

The present disclosure describes a system and method for predicting whether a driver of a host vehicle or a remote vehicle intends to make a left or right turn or travel straight through an intersection before the host vehicle or remote vehicle reaches the intersection that relies on a probability model including a dynamic Bayesian network. The method includes obtaining a plurality of environmental cues that identify external parameters at or around the intersection, where the environmental cues include position and velocity of the remote vehicle, and obtaining a plurality of host vehicle cues that define operation of the host vehicle. The method then predicts the turning intent of the host vehicle and/or remote vehicle at the intersection based on both the external cues and the vehicle cues using the model. The method can use previously learned turning information at the intersection by the host vehicle and/or the remote vehicle in the probability model and use the calculated probability of a turn in a threat assessment and decision making algorithm.

Additional features of the present invention will become apparent from the following description and appended claims, taken in conjunction with the accompanying drawings.

DETAILED DESCRIPTION OF THE EMBODIMENTS

Figure 1:
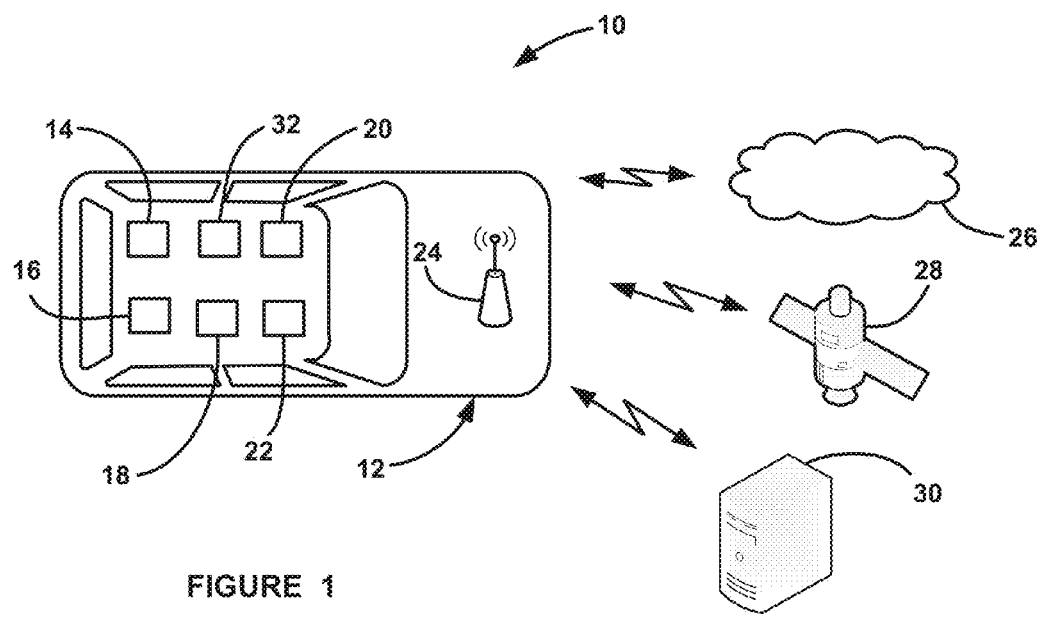
FIG. 1 is an illustration of a vehicle including various components for identifying operation of the vehicle and detecting objects around the vehicle.

The following discussion of the embodiments of the invention directed to a system and method for predicting whether a driver of a host vehicle or remote vehicles intends to turn left or right or go straight through an intersection is merely exemplary in nature, and is in no way intended to limit the invention or its applications or uses.

As will be discussed in detail below, the present invention proposes a technique for predicting whether a driver of a host vehicle or remote vehicles intends to turn left or right or travel straight through an intersection as the host vehicle approaches the intersection, where the driver turning intent for turning or going straight is interchangeably referred to herein as turning intent or maneuver intent. The prediction algorithm employs a probability model including a dynamic Bayesian network (DBN) that uses available cues, including environmental cues of things happening around the host vehicle and vehicle cues of host vehicle dynamics. Inputs to the prediction algorithm can be provided by any available source, such as a CAN bus on the host vehicle, digital maps, sensors, V2V and V2X communications systems, cameras on the vehicle, etc.

As is well understood by those skilled in the art, a Bayesian network is a probability graphical model that represents a set of random variables and their conditional dependencies. A dynamic Bayesian network is a Bayesian network that relates variables to each other over adjacent time steps. A generative model is a model that randomly generates observable data values, typically given some hidden parameters, and specifies a joint probability distribution over observation and label sequences. Discriminative models are a class of models used in machine learning for modeling the dependence of an unobserved variable on an observed variable x, and is done by modeling the conditional probability distribution $P(y|x)$, which can be used for predicting y from x. The present invention predicts real time turning intent of a host vehicle or remote vehicles by integrating vehicle sensory data with a learning module that maps intersection schematics and defines the relationships between cues, a probabilistic model that utilizes available cues to predict driver intent, and a threat assessment and decision making module.

It is noted that the discussion herein is specific to vehicle travel direction on the right, where a vehicle making a left turn will cross lanes for oncoming traffic. However, it is stressed that the algorithms and discussion herein equally apply to those countries and roadways where vehicles travel on the left and would cross in front of oncoming traffic when making a right turn. It is also noted that, as will be understood by those skilled in the art, the algorithm parameters described here can be adjusted to suit different driver-selectable configurations, such as aggressive, normal, conservative, etc., to modify the warning/output timing provided by the particular feature. Alternatively, the system can itself adjust these parameters based on the driving style of the driver. Further, the algorithms discussed herein may be applicable for other vehicle maneuvers for other driving scenarios including non-cross-shape geometry intersections.

FIG. 1 is a simple illustration of a vehicle system 10 that includes a vehicle 12 having a map database 14, a navigation system 16, an operation controller 18, a warning device 20, sensors/detectors 32 and a vehicle controller 22. The controller 18 is intended to represent all of the various modules, controllers, processors, electronic control units, etc. that are necessary to perform and operate the various algorithms and processes discussed herein. The map database 14 stores map information at any level of detail that is available, including specific information about intersections, such as the number of travel lanes, the lane travel patterns, etc. The map database 14 operates in association with the navigation system 16 to display the various maps and other information that is available, and allow a user to input, plan and display a route. The map database 14 may also provide dynamic information of traffic flow, and provide different statistics or vehicle behavior prototypes. The sensors/detectors 32 are intended to represent any and all object detection sensors or cameras on the vehicle 12, such as forward, rear and side cameras, back-up cameras, lidar sensors, long range radar detectors, short range radar detectors, etc., located at any position on the vehicle 12. The warning device 20 can be any suitable warning device, such as display icons, haptic seat, chimes, etc. The controller 22 controls the operation of the vehicle 12, including steering, brake, throttle, etc., possibly for both autonomous and semi-autonomous capabilities, and provides any other vehicle control consistent with the discussion herein. The vehicle 12 also includes a wireless port 24 that allows the vehicle 12 to wirelessly transmit messages and receive messages from many sources, such as the Internet 26, a satellite 28, a wireless infrastructure 30, etc. The wireless port 24 also allows the vehicle 12 to provide V2I and V2V communications, if available.

Figure 2:
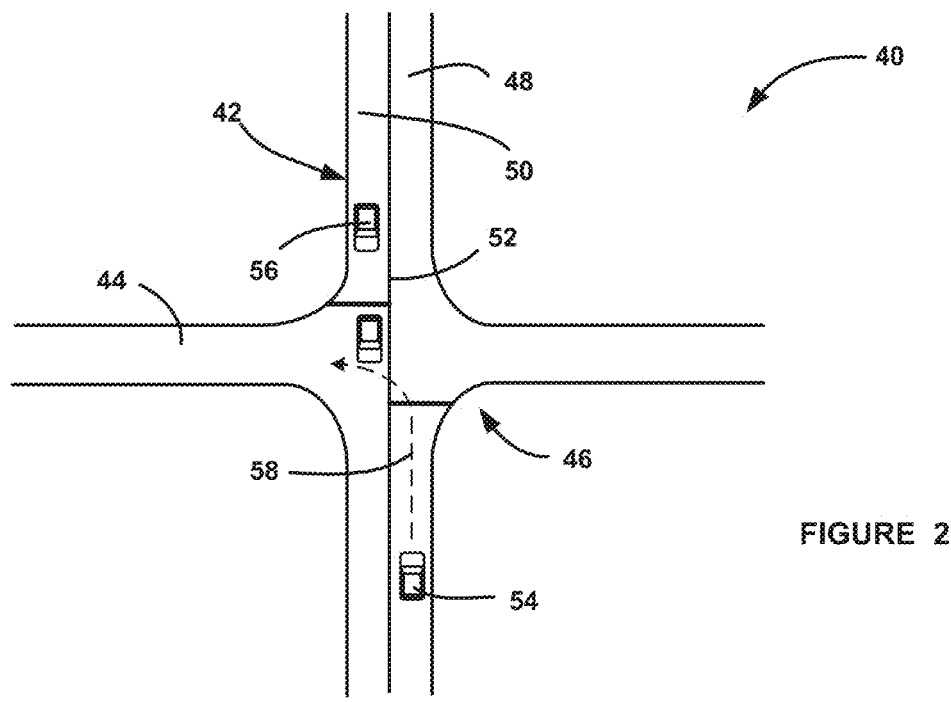
FIG. 2 is an illustration of an intersection showing a host vehicle making a left turn relative to remote vehicles.

FIG. 2 is an illustration 40 showing perpendicular roadways 42 and 44 defining an intersection 46, where the roadway 42 includes opposing traffic lanes 48 and 50 separated by a center lane 52. A host vehicle 54 is traveling in the lane 48 and opposing remote vehicles 56 are traveling in the lane 50, where the host vehicle 54 is intending to turn left into the roadway 44. The host vehicle 54 may slow down at the intersection 46 when there is a stop sign or a signal even when the host vehicle 54 is going straight through the intersection 46. Not knowing the intent of the host vehicle 54 or the remote vehicles 56 becomes even more problematic if there is only a single lane for all straight through, left-turning and right-turning vehicles.

Figure 3:
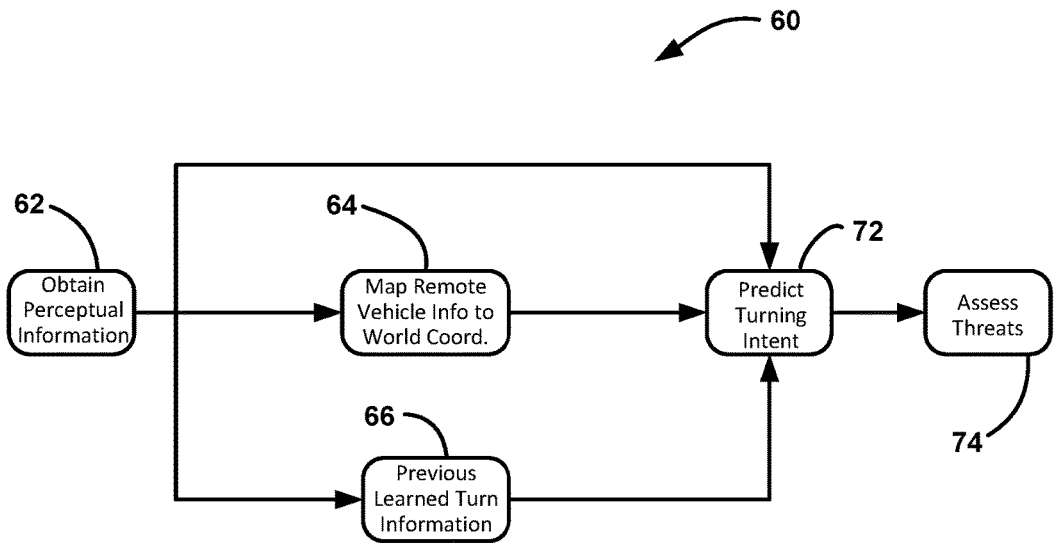
FIG. 3 is a schematic block diagram of a system employing a prediction of driver intent.

FIG. 3 is a schematic block diagram of a system 60 generally showing a process for predicting the turning intent of the host vehicle 54 and/or any of the remote vehicles 56, as generally referred to above. The system 60 obtains internal and external perceptual information at box 62 that can be information from any available source, such as a CAN bus on the host vehicle 54, the digital map database 14, the sensors 32, V2V and/or V2X communications, roadside information units, information sent from the remote vehicles 56, vehicle position, speed and acceleration, traffic light state, traffic signs, detected pedestrians, location of objects, etc., where the host vehicle information and the remote vehicle information may define a data structure whose fields refer to all of the relevant signals. Remote vehicle information is mapped from the host vehicle coordinate frame to the world coordinate frame at box 64 so that any signal from the remote vehicles 56 can be handled by the probability model (DBN) similarly to signals from the host vehicle 54. That is, the mapping translates the signals to allow a reference to the remote vehicles 56, which identifies the specific information that is needed to predict the turning intent of the host vehicle 54 and the remote vehicles 56 by the same algorithm even in the case where signals related to the remote vehicles 56 are provided partially with respect to those provided for the host vehicle 54.

A turning intent algorithm uses a probability model to predict the turning intent of the host vehicle 54 and/or the remote vehicles 56 at box 72 based on the mapped remote vehicle information from the box 64, the host vehicle information from the box 62, and previously learned turning information for a particular intersection provided at box 66. The previously learned turning information provided at the box 66 is obtained by processing signals related to each turning maneuver separately and extracts values for the parameters being used by the probability model. The previously learned turning information is provided from when the host vehicle previously passed through the intersection and is obtained by capturing, recording and processing signals related to host vehicle turning maneuvers and remote vehicle turning maneuvers. This allows the model to be trained with a better prediction ability and to personalize the model to a specific driver and to a specific intersection. Further, providing information for a specific driver gives the ability to personalize the algorithm with respect to general driver characteristics or to different driving cultures, such as for different countries. Also, personalizing the model with respect to intersections gives the ability to personalize respect to different types of intersections that may differ in the size, number of lanes, heading directions, etc. It is noted that the learning algorithm at the box 66 has the ability to be turned on or off in that it can be used to inform the driver that active safety features have been engaged at an intersection.

The turning intent algorithm employs a probability model based on a dynamic Bayesian network (DBN) that analyzes the signals related to a vehicle during some time window with respect to the turning maneuver options available for that vehicle and gives a probability of a turn based on those signals, as will be discussed in detail below, where the combination of the probability that the host vehicle 54 or one of the remote vehicles 56 will turn left, turn right or go straight will add up to one. The DBN takes advantage of accumulated information along a time interval and does not calculate probabilities according to information at specific time points separately. Once the predicted turning intent of the host vehicle 54 for turning left $P^{HV_{left}}$, turning right $P^{HV_{right}}$ or going straight $P^{HV_{straight}}$ and any of the remote vehicles 56 for turning left $P^{RV_{left}}$, turning right $P^{RV_{right}}$ or going straight $P^{RV_{straight}}$ are determined at the box 72, then that information is used in any threat assessment and decision making algorithm on the vehicle 54 at box 74 that would benefit from that information. The threat assessment and decision making box 74 uses the calculated probabilities for different maneuvers in real-time to assess potential dangers and act to minimize them.

Figure 4:
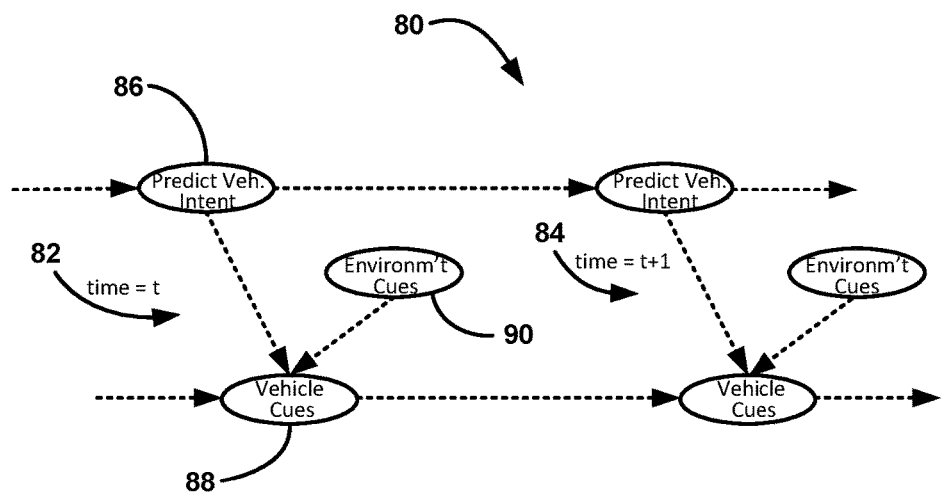
FIG. 4 is an illustration of a dynamic Bayesian network including nodes for driver intent and vehicle and environmental cues at progressive time steps.

FIG. 4 is an illustration of a DBN 80 of the type that can be employed in the probability model at the box 72, where the BDN 80 includes information nodes that are influenced by each other at time step t represented generally by reference numeral 82 and a subsequent time step t+1 represented generally by reference numeral 84. The discussion below will refer to the turning intent of the host vehicle 54. However, the same DBN can be employed to determine the turning intent of any of the remote vehicles 56 based on what information is available, where predicting the turning intent of the remote vehicles 56 will generally have less available information, and thus less accuracy. The DBN 80 includes nodes 86 that predict whether the host vehicle 54 intends to turn or travel straight through the intersection, and when the host vehicle 54 intends to make the maneuver, as influenced by the various cues C that are available to the prediction algorithm. Relevant cues C include, but are not limited to, distance to the intersection, turn signal activity, velocity of the host vehicle 54, acceleration of the host vehicle 54, yaw rate of the host vehicle 54, heading of the host vehicle 54, steering/road wheel angle of the host vehicle 54, curvature level of preceding road segments that the host vehicle 54 traveled, position and velocity of the remote vehicles 56, traffic signs, traffic lights, map branching, etc. The cues C include vehicle cues $C_v$ at nodes 88, and include any information available on the vehicle 54, such as vehicle speed, vehicle braking, turn signal activity, road wheel angle, yaw rate, etc., and environmental cues $C_e$ at nodes 90 that may influence the turning intent of the host vehicle 54. It is noted that the vehicle cues $C_v$ may depend on the driver's intent, but the environmental cues $C_e$ do not. By understanding the actual relationships between the nodes 86 and modeling them explicitly by functions facilitates the ability of real-time learning because any new instance of information can be decomposed to update each of the functions, and thus there is no need to relearn from scratch by processing the entire accumulated information. The turning intent of the host vehicle 54 at the time step 82 affects, for example, the turning intent of the host vehicle 54 at the next time step 84. Further, the turning intent of the host vehicle 54 at the nodes 86 influences how the vehicle 54 behaves, and thus may alter the vehicle cues $C_v$ at the node 88. Further, the vehicle cues $C_v$ at the time step 82 influence the vehicle cues $C_v$ at the next time step 84.

For the equations used in the probability model discussed herein, all relevant signals can be used in the model, but in some cases they will not all be available. This ability is desirable in that the algorithm has the ability to process signals with no modification to the algorithm when only partial information is available. Thus, the algorithm will not fail or stop providing output when certain ones of the signals are not being provided at any particular point in time, although the accuracy of the probability may be reduced. The probability equations determine the probability of the vehicle 54 to perform each of the possible turning maneuvers M given vehicle cues related to the vehicle 54, such as kinematic signals including velocity, acceleration and yaw rate, and environmental cues $C_e$ related to the environment, such as distance to intersection, movement of surrounding objects, traffic light status and traffic sign detection. The model is based on a given set of probability functions that first define a prior vehicle maneuver) $P(M^0)$ at time zero, which is defined to be when the vehicle 54 is a predetermined distance from the intersection and the likelihood probabilities of the vehicle cues $C_v$ at that time. The joint probabilities are calculated from the cues C according to their values as observed over the entire time frame from time zero to time T, which is continuously extended as the vehicle 54 approaches the intersection.

Calculating the joint probability over a time frame can be highly complex and generally depends on the frequency in which the cues C are received. Dynamic programming is used in order to provide the calculations efficiently in real-time by decomposing the joint probability over the time frames into three components, namely, the joint probability over the time frame until time t, the likelihood probability of changing the maneuver intent between time t and time t+1, and the likelihood probability of the cues C being observed only at time t+1. That is, at each time step numbers are used that have already been calculated in the previous time step and added new components that are easy to derive. This technique allows the complexity of the algorithm to be spread evenly between the time in which the algorithm is executed and the time in which the host vehicle 54 enters the intersection. The probability of the maneuver intent is continuously being displayed while the vehicle 54 approaches the intersection. This allows not only the probability to be continuously processed in order to access collision threats, but also to process the derivatives of the calculated probabilities, which can significantly enhance threat assessment abilities, such as by observing that a probability of a turning maneuver M is significantly increasing before it actually crossed a pre-defined threshold.

Based on all of the vehicle cues $C_v$ and environmental cues $C_e$ that are available to the prediction model, the algorithm predicts the probability P that the host vehicle 54 and/or the remote vehicles 56 will turn left M=L at the intersection, will travel straight M=S through the intersection, or will turn right M=R at the intersection as:

$$P(M|C_v,C_e) \text{ for } M=L/S/R. \quad (1)$$

Further, the algorithm defines the prior and likelihood probability functions:

$$P(M^0), \quad (2)$$

$$P(M^{t+1}|M^t), \quad (3)$$

$$P(C_v^0|M^0,C_e^0), \quad (4)$$

$$P(C_v^{t+1}|M^{t+1},C_e^{t+1},C_v^t), \quad (5)$$

as defined by Bayes Law:

$$P(M|C_v,C_e)=P(M,C_v,C_e)/P(C_v,C_e) \propto P(M,C_v,C_e). \quad (6)$$

Using dynamic programming, a two time-slice Bayesian network can be defined as:

$$P^t \text{as } P(M^t|M^{[0,t-1]},C_e^{[0,t]},C_v^{[0,t]}), \quad (7)$$

$$P^{t+1}=P^t \cdot P(M^{t+1}|M^t,C_v^t C_e^{t+1},C_v^{t+1}) \propto P^t P(M^{t+1}|M^t)P \\ (C_v^{t+1}|M^{t+1},C_v^t,C_e^{t+1}). \quad (8)$$

Figure 5:
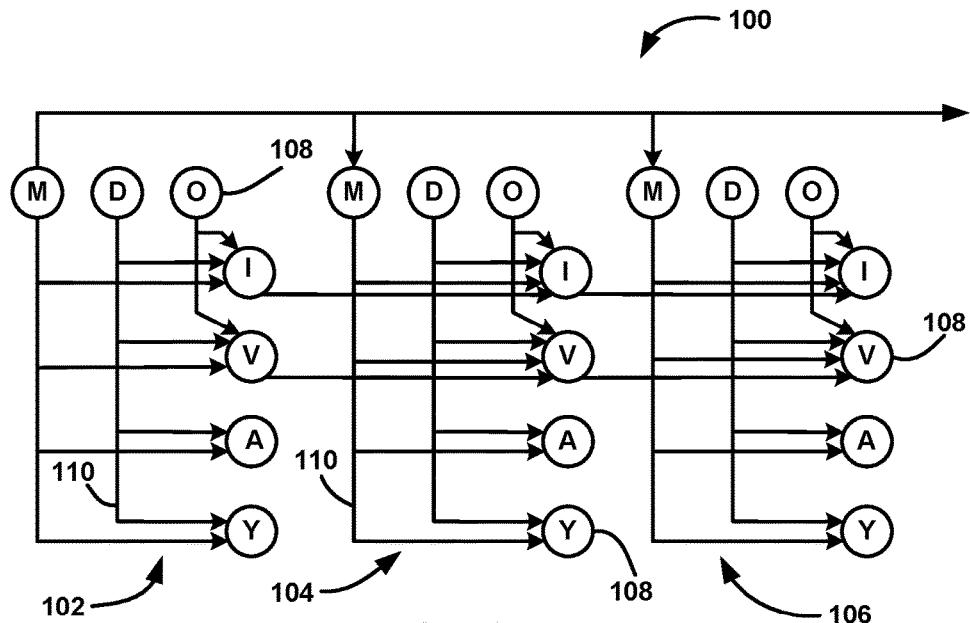
FIG. 5 is a flow chart diagram showing a dynamic Bayesian network process for predicting driver maneuver intent.

FIG. 5 is an illustration of another DBN 100 showing a more specific example of predicting whether a vehicle driver intends to turn left, turn right or go straight through an intersection as to how different inputs are influenced by other information at subsequent time steps t, t+1 and t+2, represented generally by reference numbers 102, 104, and 106, respectively. The DBN 100 includes a number of nodes generally represented by 108 and arrows 110 that indicate how the various variables and solutions are influenced or influence other variables. In the DBN 100, the nodes 108 designated M are for driver maneuver intent, V is host vehicle velocity and is a vehicle cue, I is turn signal activity and is a vehicle cue, A is vehicle acceleration and is a vehicle cue, Y is vehicle yaw rate and is a vehicle cue, O is a detected obstacle, which are given by the obstacles relative position and velocity, and is an environment cue, and D is the distance to the intersection and is also an environmental cue. As the host vehicle 54 gets closer to the intersection, the accuracy of the prediction of the driver's turning intent at the intersection will increase.

For this example, the prediction of the drivers turning intent for each of turning left, turning right and going straight at the intersection can be defined by the prediction function:

$$P(M_{t+1}|M_{[0,t]},D_{[0,t+1]},O_{[0,t+1]},I_{[0,t+1]},V_{[0,t+1]},A_{[0,t+1]},Y_{[0,t+1]})=P(M_t)P(M_{t+1}|M_t)P(I_t,M_{t+1},D_{t+1},O_{t+1})P(V_{t+1}|V_t,M_{t+1},D_{t+1},O_{t+1})P(A_{t+1}|M_{t+1},D_{t+1})P(Y_{t+1}|M_{t+1},D_{t+1}). \quad (9)$$

A number of conditional probabilities can be employed. One non-limiting example is given below, where P(IV|M,D) is calculated with the normal distribution as:

$$P(V=v|M=m,D=d) \sim N(\mu(d),\sigma_V) = \frac{1}{\sigma_V\sqrt{2\pi}}e^{-\frac{(x-\mu)^2}{2\sigma_V^2}}, \quad (10)$$

where µ, representing an averaged velocity profile, is modeled by a four-degree polynomial as:

$$\mu(D)=\Sigma_{i=1}^4 a_i D^i, \quad (11)$$

and where:

$$P(YR=yr|M=m,D=d) \sim N(\mu(d),\sigma_{YR}), \quad (12)$$

where µ, representing an averaged yaw rate profile, is modeled by an exponent as:

$$\mu(D) = YR_{max}^m e^{-\frac{(D-0.05)^2}{2 \cdot 0.05^2}}, \quad (13)$$

and where:

$$P(I=i|M=m,D=d) \sim N(\mu(d), \sigma_1), \quad (14)$$

where μ, representing an averaged turn signal activation profile, is modeled by a logistic function as:

$$\mu(D) = \frac{p_m}{1 + e^{-a(D-c)}}. \quad (15)$$

Figure 6:
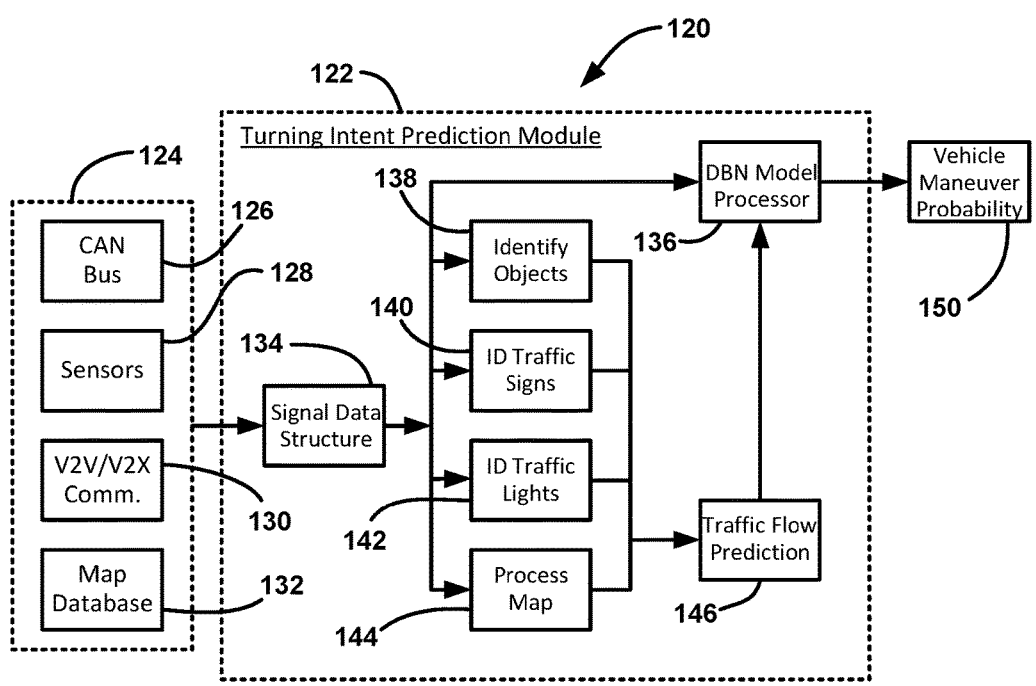
FIG. 6 is a flow block diagram showing a process for predicting driver maneuver intent.

FIG. 6 is a flow block diagram of a system 120 for predicting driver maneuver intent for the host vehicle 54 or any of the remote vehicles 56 in the manner discussed above. The system 120 includes a turning intent prediction module 122 that receives relevant cues and information from inputs 124, which in this non-limiting example include a CAN bus 126, sensors 128, V2V/V2X communications 130 and a map database 132. Signals from the inputs 124 are provided to a signal data structure 134 in the module 122 that provides signal processing to combine the signals, such as sensor signal fusion. The processed input signals are then sent to a DBN model processor 136 that predicts the driver maneuver intent using a dynamic Bayesian model as discussed herein. The prediction module 122 also assesses traffic flow at the intersection as determined by a traffic flow prediction processer 146. To do this, the processed input signals are also provided to a processor 138 for identifying surrounding objects, a processor 140 for identifying traffic signs, a processor 142 for identifying traffic lights, and a process map 144. The identification of the surrounding objects, the traffic signs, the traffic lights and the map are provided to the processor 146 to predict the traffic flow, which determines the probability of whether the host vehicle 54 or the remote vehicle 56 will proceed, give right-of-away or stop for each of the left turn, right turn or straight through maneuvers. That probability is used in the model processor 136 to identify the probability of a certain vehicle maneuver at box 150.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for predicting turning intent of a host vehicle when approaching an intersection, said method comprising:
obtaining, using object sensors onboard the host vehicle, a plurality of environmental cues that identify external parameters at or around the intersection, said environmental cues including position and velocity of remote vehicles, where the object sensors include one or more of cameras, LIDAR sensors and radar detectors;
obtaining, from a vehicle CAN bus and vehicle sensors, a plurality of host vehicle cues that define operation of the host vehicle;
obtaining previously learned turning information from when the host vehicle previously passed through the intersection that is obtained by capturing, recording and processing signals related to host vehicle turning maneuvers and remote vehicle turning maneuvers including extracting values for parameters being used to predict the turning intent so as to allow better prediction ability and personalization to a specific driver and to a specific intersection; and
predicting, using a controller receiving signals from the object sensors, the CAN bus and the vehicle sensors, the turning intent of the host vehicle at the intersection before the host vehicle reaches the intersection based on both the environmental cues and the vehicle cues, wherein predicting the turning intent of the host vehicle includes predicting the probability that the host vehicle will turn right, the probability that the host vehicle will turn left, and the probability that the host vehicle will travel straight through the intersection.

2. The method according to claim 1 wherein predicting the turning intent of the host vehicle includes using a probability model.

3. The method according to claim 2 wherein predicting the turning intent of the host vehicle includes using a dynamic Bayesian network probability analysis.

4. The method according to claim 1 further comprising predicting a turning intent of one or more remote vehicles at the intersection.

5. The method according to claim 4 wherein predicting the turning intent of remote vehicles includes using the environment cues.

6. The method according to claim 1 further comprising predicting traffic flow in the intersection and providing a probability that the host vehicle will proceed, give right-of-way or stop based on the turning intent of the host vehicle.

7. The method according to claim 6 wherein predicting traffic flow includes processing signals concerning objects surrounding the host vehicle, traffic signs, traffic lights and a map database.

8. The method according to claim 1, wherein predicting the turning intent of the host vehicle includes using the previously learned turning information of the host vehicle at the intersection.

9. The method according to claim 1 wherein obtaining environmental cues include obtaining a distance to the intersection.

10. The method according to claim 1 wherein obtaining host vehicle cues includes obtaining one or more of turn signal activity, host vehicle velocity, host vehicle acceleration, host vehicle yaw rate, host vehicle heading and host vehicle steering/road wheel angle.

11. The method according to claim 1 wherein obtaining environmental cues includes obtaining one or more curvature of a preceding road segment, traffic signs, traffic lights and map branching.

12. The method according to claim 1 wherein obtaining a plurality of environmental cues and a plurality of host vehicle cues includes using information from one or more of a map database, V2X communications, and roadside information units.

13. The method according to claim 1 further comprising using the prediction of the turning intent of the host vehicle in a collision avoidance system.

14. A method for predicting turning intent of a host vehicle or a remote vehicle at or near an intersection, said method comprising:
- obtaining, using object sensors onboard the host vehicle, a plurality of environmental cues that identify external parameters at or around the intersection, said environmental cues including position and velocity of the remote vehicle, where the object sensors include one or more of cameras, LiDAR sensors and radar detectors;
- obtaining, from a vehicle CAN bus and vehicle sensors, a plurality of host vehicle cues that define operation of the host vehicle;
- obtaining information of previous turning maneuvers of the host vehicle at the intersection based on providing previously learned turning information from when the host vehicle previously passed through the intersection that is obtained by capturing, recording and processing signals related to host vehicle turning maneuvers and remote vehicle turning maneuvers including extracting values for parameters being used to predict the turning intent so as to allow better prediction ability and personalization to a specific driver and to a specific intersection; and
- predicting, using a controller receiving signals from the object sensors, the CAN bus and the vehicle sensors, the turning intent of the host vehicle or the remote vehicle at the intersection using a probability model including a dynamic Bayesian network that uses the environmental cues, the vehicle cues and the previous turning maneuver information, wherein predicting the turning intent of the host vehicle includes predicting the probability that the host vehicle will turn right, the probability that the host vehicle will turn left, and the probability that the host vehicle will travel straight through the intersection.

15. The method according to claim 14 wherein obtaining host vehicle cues includes obtaining one or more of turn signal activity, host vehicle velocity, host vehicle acceleration, host vehicle yaw rate, host vehicle heading and host vehicle steering/road wheel angle.

16. The method according to claim 14 wherein obtaining environmental cues includes obtaining one or more of curvature of a preceding road segment, traffic signs, traffic lights and map branching.

17. The method according to claim 14 further comprising predicting traffic flow in the intersection and providing a probability that the host vehicle will proceed, give right-of-way or stop based on the turning intent of the host vehicle.

18. A method for predicting turning intent of a host vehicle or a remote vehicle at or near an intersection, said method comprising:
- obtaining a plurality of environmental cues that identify external parameters at or around the intersection, said environmental cues including position and velocity of the remote vehicle, wherein obtaining environmental cues includes obtaining one or more curvature of a preceding road segment, traffic signs, traffic lights and map branching;
- obtaining a plurality of host vehicle cues that define operation of the host vehicle, wherein obtaining host vehicle cues includes obtaining one or more of turn signal activity, host vehicle velocity, host vehicle acceleration, host vehicle yaw rate, host vehicle heading and host vehicle steering/road wheel angle, and wherein obtaining a plurality of environmental cues and a plurality of host vehicle cues includes using information from one or more of radar sensors, cameras, map database, lidar sensors, V2X communications, roadside information units, and a controller area network (CAN) bus;
- obtaining information of previous turning maneuvers of the host vehicle at the intersection including providing previously learned turning information from when the host vehicle previously passed through the intersection that is obtained by capturing, recording and processing signals related to host vehicle turning maneuvers and remote vehicle turning maneuvers including extracting values for parameters being used to predict the turning intent so as to allow better prediction ability and personalization to a specific driver and to a specific intersection; and
- predicting, using a controller receiving signals from the object sensors, the CAN bus and the vehicle sensors, the turning intent of the host vehicle or the remote vehicle at the intersection using a probability model including a dynamic Bayesian network that uses the environmental cues, the vehicle cues and the previous turning maneuver information, wherein predicting the turning intent of the host vehicle includes predicting the probability that the host vehicle will turn right, the probability that the host vehicle will turn left, and the probability that the host vehicle will travel straight through the intersection.

* * * * *